Jan. 27, 1948. J. P. SCOTT 2,435,019
TRAILER HITCH
Filed April 2, 1947 2 Sheets-Sheet 1

J. P. Scott
Inventor

By  Attorneys.

Jan. 27, 1948. J. P. SCOTT 2,435,019
TRAILER HITCH
Filed April 2, 1947 2 Sheets-Sheet 2
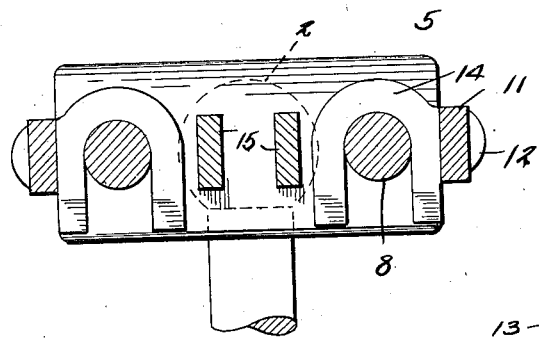
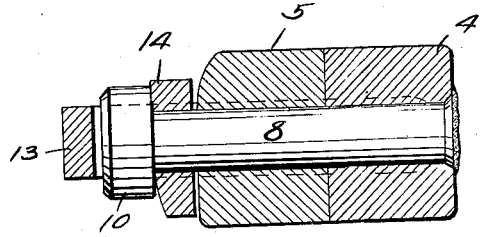
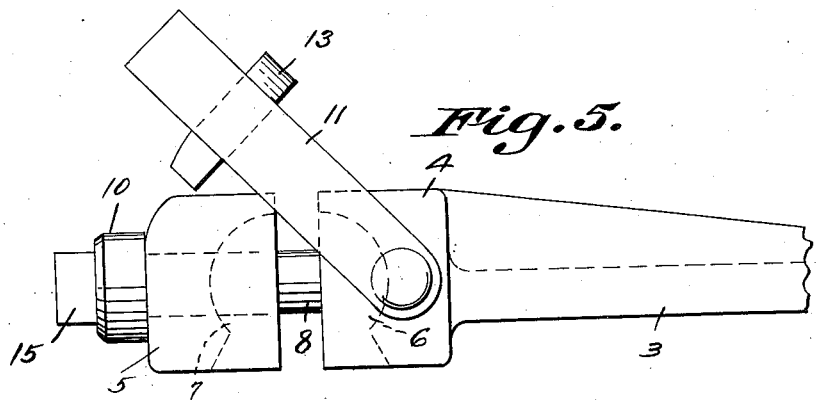
J. P. Scott
Inventor
By C. A. Snowles
Attorneys Patented Jan. 27, 1948

2,435,019

UNITED STATES PATENT OFFICE 2,435,019

TRAILER HITCH

Jared P. Scott, Bellingham, Wash.

Application April 2, 1947, Serial No. 738,794

4 Claims. (Cl. 280—33.17)

1

This invention relates to new and useful improvements in couplings and more particularly and specifically to a ball joint trailer coupling or hitch of which the following is a specification.

The primary object of this invention resides in the provision of an improved trailer hitch or coupling of the type secured to a powered vehicle which is adapted to be quickly detachably secured to a universal type ball of the conventional type carried on the towing tongue of a trailer.

Another object of this invention is the provision of a trailer coupling of the ball joint type which allows for a substantially universal movement allowance between the towing and towed vehicle thus preventing harmful shock and strain to either of the vehicles or to the coupling which would be inherent in travel on rough roads and surfaces and at varied speeds.

Another and still further object of this invention is the provision of a coupling of the character described which is so constructed as to be free of harmful "back lash" during the towing and starting and stopping of the coupled vehicles, and a coupling which may be securely placed in a locked engaging position without fear of disengagement during its use.

Still another object of this invention is the provision of a coupling of the nature set forth which may be locked against theft and which is easy and quick in engaging and disengaging operations.

Still a further object and advantage of this invention is the provision of a coupling assembly and construction of the character illustrated and described which is of an extremely simple, durable and inexpensive design and in which all the parts are integral eliminating the possibility of lost parts.

Still further improvements and advantages of this invention will readily appear to those skilled in the art when the following description is read in the light of the accompanying drawings in which:

Fig. 3 is a vertical section taken on line 3—3 of Fig. 1.

Fig. 4 is a vertical section taken on line 4—4 of Fig. 1.

Fig. 5 is a side elevation of said coupling in a disengaged condition above said tongue ball.

Figure 1:
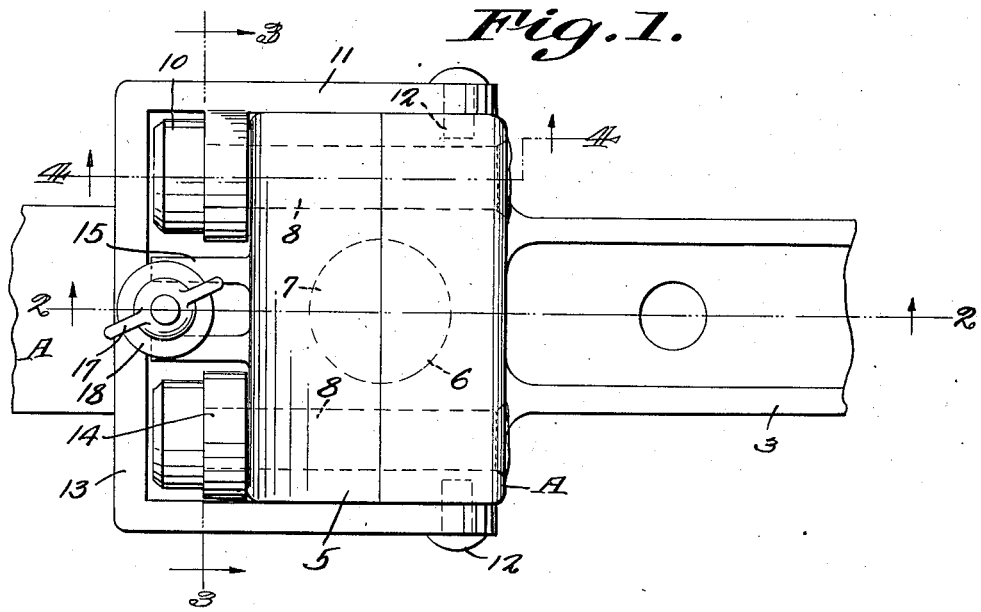
Fig. 1 is a top plan view of the assembled coupling.
Figure 2:
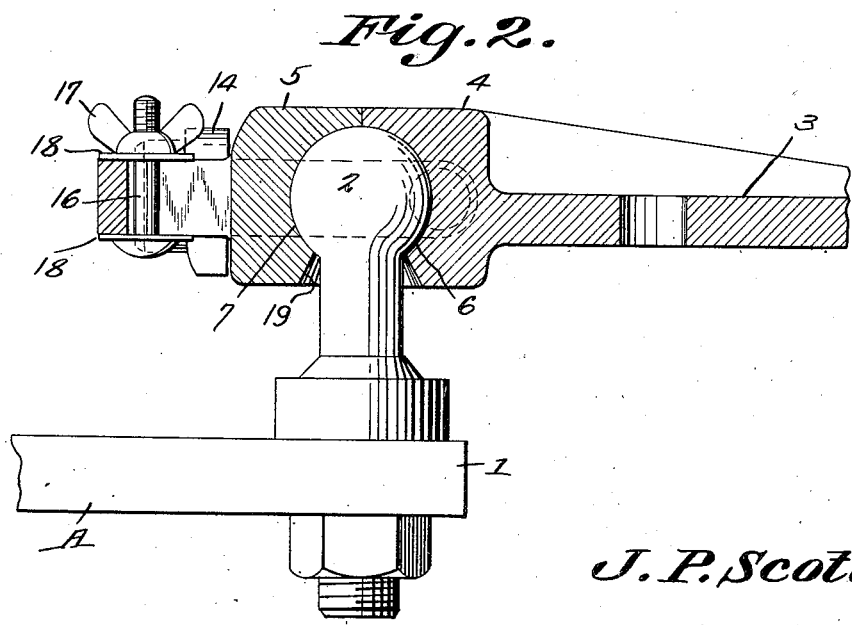
Fig. 2 is a vertical section taken on line 2—2 of Fig. 1.

Referring now to the accompanying drawings which illustrate the preferred embodiment of this invention and in which like numerals indicate similar parts throughout A designates a horizontal tongue of the type conventionally carried by a vehicle bumper and on whose outer extended end 1 is vertically carried a universal socket ball 2.

The ball socket coupling adapted to universally engage the vehicle support ball 2 comprising a shank 3 forwardly extended from the trailer which carries a pair of quick detachable sections 4 and 5 forming the coupling joint.

The section 4 is a substantially rectangular member formed integrally with and transverse to the extended end of the shank 3 and in whose outer face is centrally formed a semi-circular depression 6 of the same radius as the ball 2 and which is adapted to receive one-half of said ball thereinto.

The second section 5 of the coupling is complementary to section 4 having a similar depression 7 therein adapted to enclose the second half of the ball 2 to form a universal joint with section 4 about the ball 2 when said section 5 is moved to an adjacent position to the section 4.

The second section 5 is slidably supported complementary with section 4 by a pair of elongated bolts 8 which are welded to section 4, in parallel spaced extensions outwardly from the member 4 on either side of the depression 6 therein.

These bolts 8 carry enlarged circular heads 10 at their outer extremities at an extended position beyond the outer end of the section 5 when it is in an adjacent position to the section 4, thus allowing the movement of section 5 outwardly from section 4 within the limits of its abutment with the enlarged heads 10, this limited movement being sufficient to permit the release of the ball 2 from between depressions in the complementary sections 4 and 5.

A U-shaped bracket 11 is adapted to be disposed, as illustrated, in an adjacent bordering position about the ends of the complementary sections with the free ends thereof being pivoted in identical positions, on pins 12, carried from each end of the section 4 so that the cross bar 13 encloses the outer end of the members slightly beyond the heads 10 of the bolts 8.

A pair of identical inverted U-shaped extensions 14 are carried by said side members of the bracket 11 intermediate their length and in an inwardly disposed position adapting them to receive that section of the adjacent bolt 8, between the head thereof and the outer end of the section 5 when in an adjacent position to section 4, upwardly thereinto thus forming a spacer lock preventing the movement of the section 5 outwardly from the locking position.

Additionally the section 5 carries a pair of spaced ears 15 which extend centrally outwardly therefrom between the heads 10 of the bolts 8 to a close spaced position relative to the cross bar 13 of the bracket when it is in a closed locking position.

An elongated bolt 16 provided with a wing nut 17 is adapted to be disposed upwardly between the ears 15 and clamp a pair of enlarged washers 18 circumferentiating the bolt in an overlying adjacent position adjacent the underside of the ears 15 and the cross bar 13 and similarly the upper surfaces thus locking the bracket 11 in a locked position and preventing the disengagement of the sections from the ball by shock and strain during towing but allowing the quick manual release thereof when desired.

An additional feature of the locking of the coupling lies in the adaptability of the bolt and wing nut to be replaced by a padlock which would similarly retain said washers in clamping locking position.

An additional construction lies in the outwardly flared depression 19 about the lower portion of each of the depressions 6 and 7 permitting the easy manual insertion and removal of the ball 2 relative to the sections 4 and 5.

Thus it may be readily seen that a new and improved universal coupling has been provided embodying useful and economical features in operation and construction.

Having thus described and explained the construction and function of this invention and with full belief that modifications in size, materials and general characteristics would not constitute a departure from the spirit of this invention what I desire to claim in Letters Patent is:

1. A trailer hitch of the character described comprising, a shank, a jaw member formed integral with the shank and being disposed transversely thereof, a pair of headed bolts horizontally extended from and secured to said jaw, a second complementary jaw slidably mounted on the bolts within the limits of said heads, a U-shaped bracket pivoted to said first jaw and being movable to a position enclosing the bolts and bolt heads, means carried by said bracket adapted to lock said sliding jaw in a close adjacent position to said first jaw, and a locking means adapted to secure said bracket in said jaw locking position.

2. A trailer hitch of the character described comprising, a shank, a jaw section integrally formed transverse one end of said shank, a pair of spaced headed bolts secured in extending positions from said jaw section, a second complementary jaw slidably carried by said bolts relative to said first jaw within the limits of said heads, a U-shaped bracket pivoted to said first jaw in a manner adapting it to horizontally enclose said second jaw and heads of said bolts, a pair of inverted U-shaped members extending inwardly from said bracket intermediate the length of its side members, means adapting said extensions to receive said adjacent bolt upwardly thereinto at that section intermediate the head and outer edge of the second jaw when closed, and means for locking said bracket in said locking condition.

3. A construction as set forth in claim 2 wherein, the adjacent faces of said jaws are provided each with aligned semi-circular depressions adapting said sections to universally clamp a coupling ball therebetween.

4. A construction as set forth in claim 2 wherein said locking means comprises a pair of spaced extended ears paralleling said bolts and extending outwardly between the heads thereof, a pair of enlarged washers overlying the upper and lower surfaces of said ears and said bracket, and means interconnecting and clamping said washers in said overlying locking positions for the purpose described.

JARED P. SCOTT.

REFERENCES CITED

The following references are of record in the file of this patent:

UNITED STATES PATENTS

| Number | Name | Date |
| --- | --- | --- |
| 1,953,365 | Reetz | Apr. 3, 1934 |
| 2,181,178 | Duncan | Nov. 28, 1939 |